April 7, 1936. F. A. STEVENS 2,036,552
OPHTHALMIC MOUNTING
Filed July 18, 1935 3 Sheets-Sheet 1
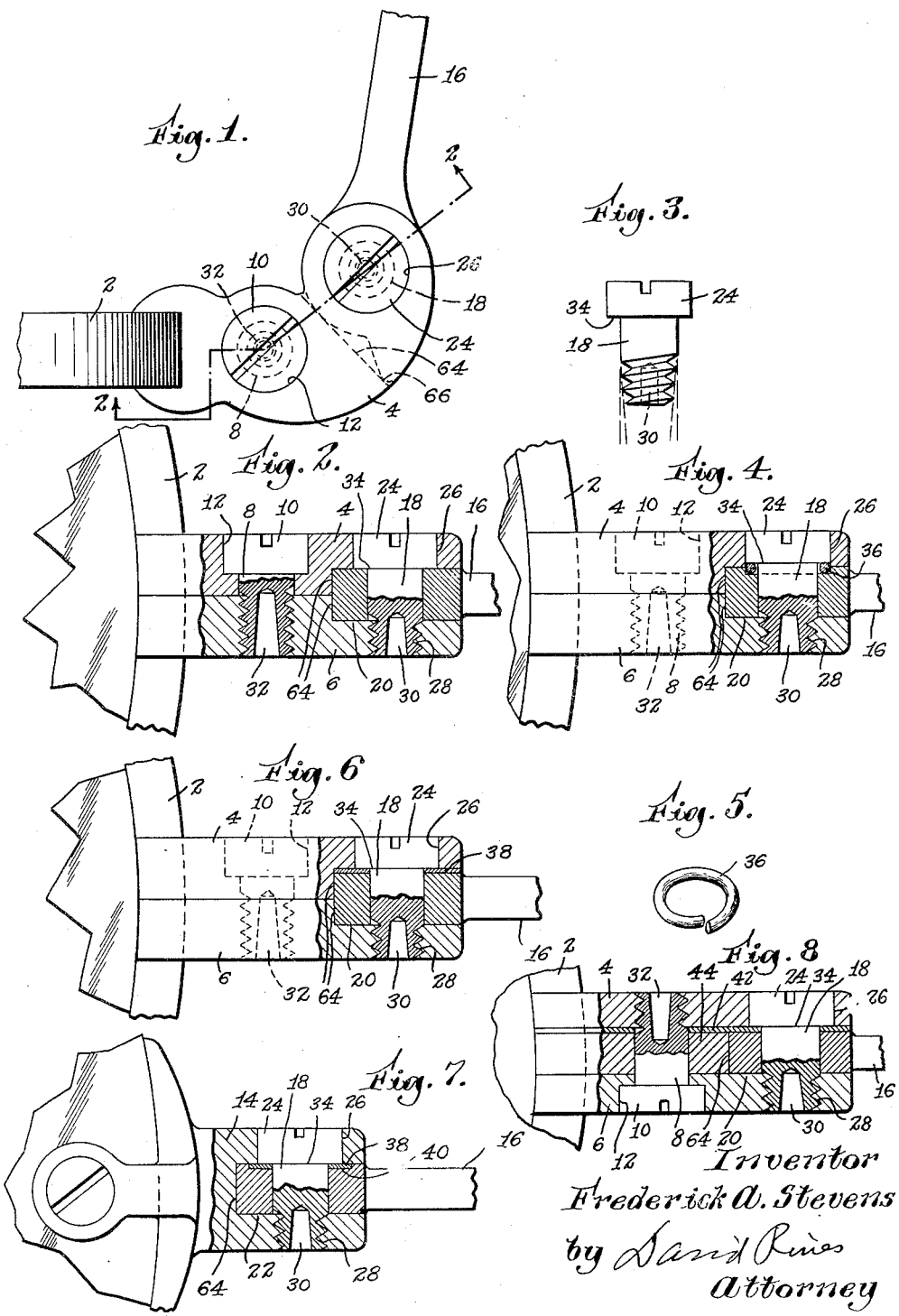
Inventor
Frederick A. Stevens
by David Rines
Attorney April 7, 1936.  F. A. STEVENS  2,036,552
OPHTHALMIC MOUNTING
Filed July 18, 1935   3 Sheets-Sheet 2

Inventor
Frederick A. Stevens
by David Rines
Attorney

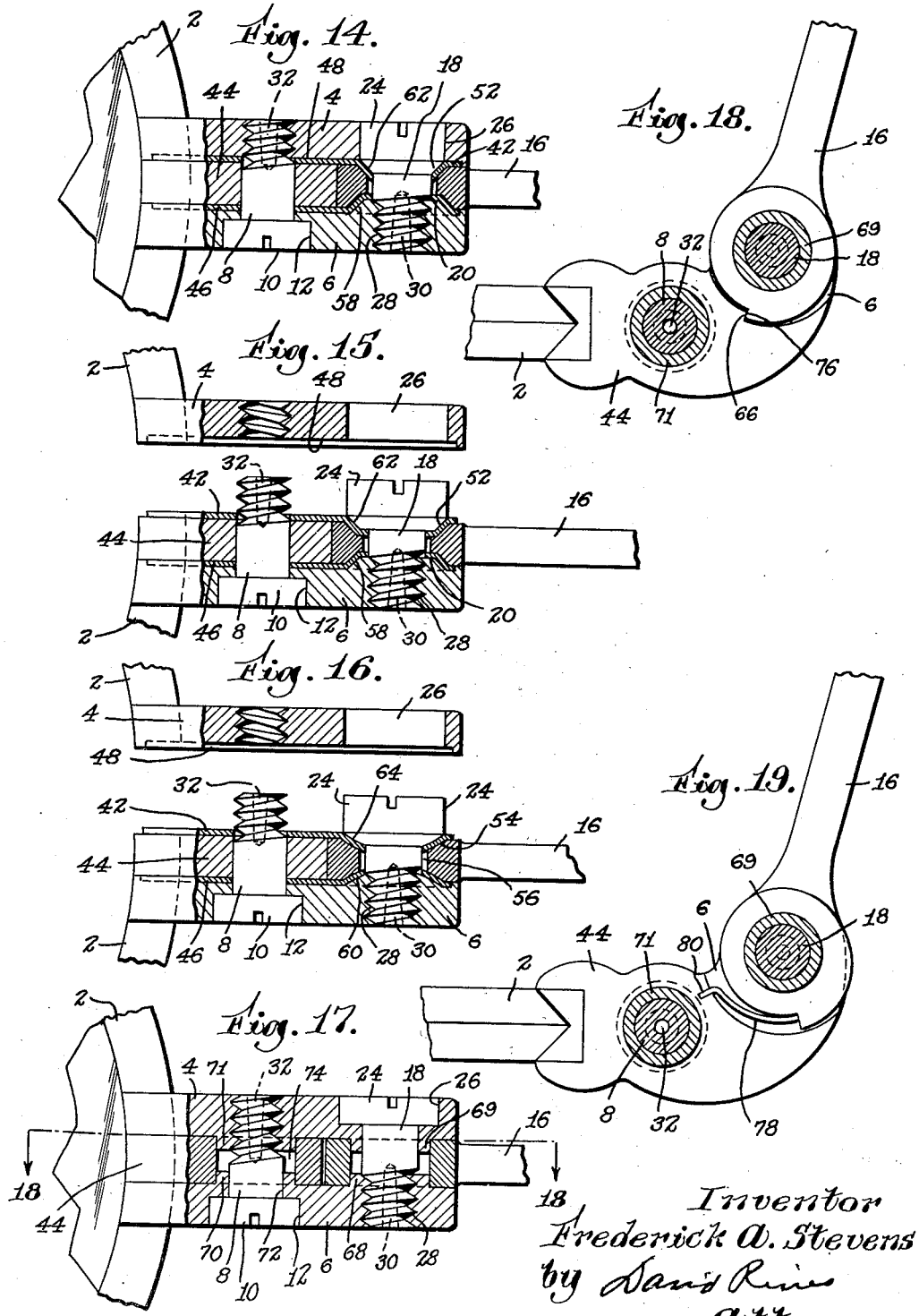

Patented Apr. 7, 1936

2,036,552

UNITED STATES PATENT OFFICE 2,036,552

OPHTHALMIC MOUNTING

Frederick Arthur Stevens, Providence, R. I.

Application July 18, 1935, Serial No. 32,005

13 Claims. (Cl. 88—53)

The present invention relates to ophthalmic mountings, and more particularly to the connection of temples to spectacles.

The temple is sometimes mounted pivotally about a post so as to swing between two end pieces secured to the ends of a split rim, and which are held together by a screw. The post is provided with terminal threads for screwing into one of the end pieces, though it has a smooth, unthreaded, bearing portion for the temple. The post keeps on unscrewing, however, thereby loosening the temple.

An object of the present invention is to provide a non-loosening temple.

Other and further objects will be explained hereinafter and will be particularly pointed out in the appended claims.

Figure 9:
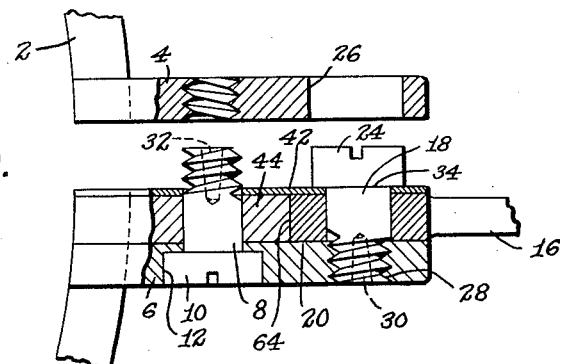
Figure 10:
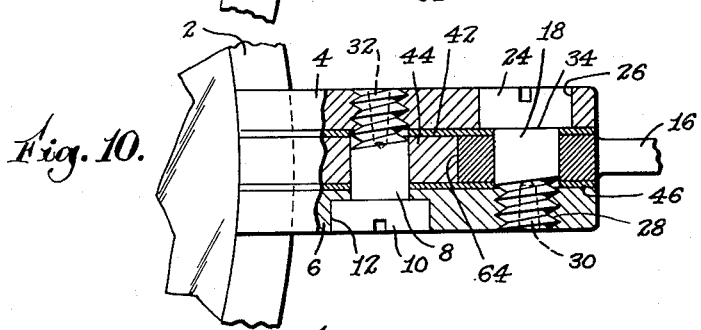
Figure 11:
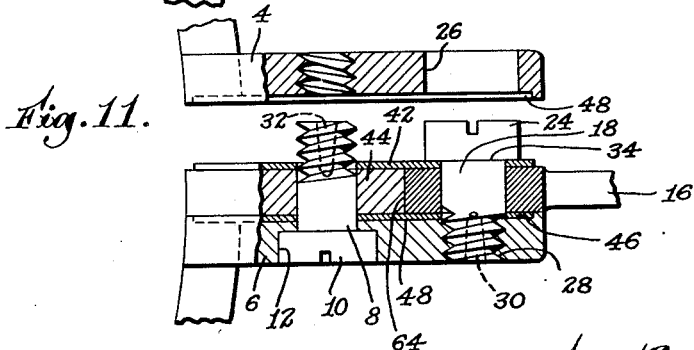
Figure 13:
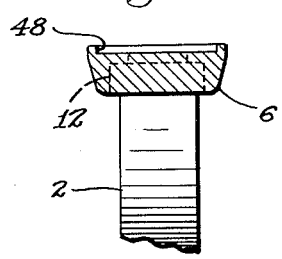
Figure 12:
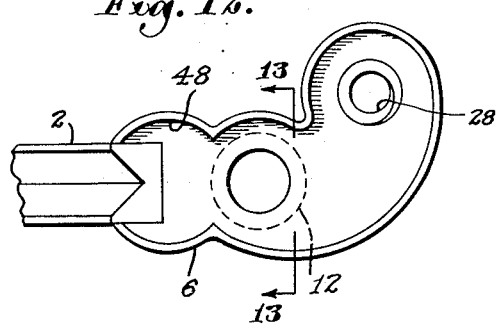

The invention will be explained more fully in connection with the accompanying drawings, in which Fig. 1 is a fragmentary plan of an ophthalmic mounting embodying the present invention; Fig. 2 is a vertical section, taken upon the line 2—2 of Fig. 1, looking in the directions of the arrows; Fig. 3 is an elevation of a preferred screw; Fig. 4 is a section similar to Fig. 2 of a modification; Fig. 5 is a perspective of a split ring employed in the modification of Fig. 4; Figs. 6 to 8 are sections similar to Figs. 2 and 4 of further modifications; Fig. 9 is a section similar to Fig. 8, showing the upper end piece separated from the lower end piece to permit the removal or the reinsertion of a lens; Fig. 10 is a section similar to Fig. 8 of a further modification; Fig. 11 is a section similar to Fig. 9 of another modification; Fig. 12 is a plan of the lower end piece shown in Fig. 11; Fig. 13 is a section taken upon the line 13—13 of Fig. 12, looking in the direction of the arrows; Fig. 14 is a section similar to Figs. 2 to 8 and 10 of a further modification; Fig. 15 is a section similar to Fig. 9 of the modification shown in Fig. 14; Fig. 16 is a section similar to Fig. 15 of a further modification; Fig. 17 is a section similar to Figs. 2 to 8, 10 and 14 of still another modification; Fig. 18 is a section taken upon the line 18—18 of Fig. 17, looking in the direction of the arrows; and Fig. 19 is a section similar to Fig. 18 of a further modification.

Referring, first, to Figs. 1 and 2, the split rim 2 has end pieces 4 and 6 that are held together by a screw 8 having a head 10 mounted in a cylindrical countersunk opening or recess 12, the screw being threaded into the end piece 6, with its free, threaded end substantially flush with the free face of the end piece 6. The present invention may also be employed with spectacles of the rimless type, such as are illustrated by Fig. 7, provided with but a single end piece 14. The end pieces are constituted of the relatively light metal that is usually employed in ophthalmic mountings and the screw 8 is correspondingly small dimensioned and of correspondingly light metal. A temple 16 is shown mounted to swing about the smooth, bearing portion of a screw 18 that is threaded in the end piece 6 or 14, being confined between a portion 20 or 22 of the end piece and the enlarged head 24 of the screw, which head 24 is, therefore, freely mounted in a cylindrical opening 26 in the end piece 4 or 14. The opening 26 is not countersunk, like the opening 12 for the head 10 of the screw 8, but is alined with the threaded opening 28 in which the screw 18 is threaded. This construction is particularly advantageous in connection with spectacles of the type illustrated in Figs. 1 to 6 and 8, because it is possible, by unscrewing the screw 8, to separate the end pieces 4 and 6, as for the insertion of a new lens, without removing the temple from about its bearing screw 18. Proposals of this kind have heretofore, however, not been practical, because of the tendency of the screw 18 to become loosened.

According to the present invention, the screw 18 is provided with a longitudinally extending aperture 30 substantially parallel to the axis of the screw and extending a substantial distance from its free end toward the head 24 of the screw, so as to form a continuous, annular, exteriorly threaded wall. This annular wall of the aperture is swaged by expansion radially outward from the axis of the screw, without breaking the continuity of the annular wall, a substantial distance into the cylindrical, threaded opening 28, and into tight engagement with the wall of the threaded opening 28. The tendency for the screw 18 to loosen becomes thereby lessened.

The screw 18 is illustrated in Fig. 3, having but relatively few threads, the threads at the free end of the screw being of slightly smaller diameter than the remaining threads. Screws of this type are naturally formed in this way by the machinery that produces them, owing to the small size of the screws and the nature of the material of which they are composed. Because of this construction, they do not hold so firmly in the openings in which they are threaded, but this is compensated for by the above-described expansion of the walls of the aperture 30. If desired, of course, the screw 8 may be provided with a similar expanded aperture 32.

Notwithstanding the tighter holding action of the expanded-aperture screw 18, the temple may eventually become loosened, because of the fact that it wears against the underside 34 of the enlarged head 24, as it swings back and forth about the screw 18. This wearing action may be minimized by providing a split-spring washer 36, shown in perspective in Fig. 5 and in section in Fig. 4, or a very thin, hard, plane, steel washer 38, illustrated in Figs. 6 and 7, or some other, suitable mechanism might be interposed, such as ball bearings (not shown). The temple 16 will then wear against the washer 36 or 38, instead of against the under side 34 of the screw 18, thereby lessening the friction on the under side 34 of the head of the screw 18, and thereby tending further to prevent loosening of the screw 18. In case the washer 38 is used, it should preferably be of larger diameter than the diameter of the head 24, as illustrated, so that it may turn with the temple 16. If made of very hard material, and smooth, there would be very little friction or wear between the washer and the under side 34 of the head 24, which is of softer metal. The under side of the washer, next to the temple 16, should preferably be left rough, so as to facilitate turning with the temple. It may be located in a cavity 40. As shown in Fig. 7, the cavity may be in the temple; it may, however, be in one of the end pieces, as illustrated in Figs. 11 to 13. The opening in the washer 36 or the plate 38 is of smaller diameter than the diameter of the head 24 of the screw 18.

In all these cases, there may be maintained any desired or controlled degree of frictional contact between the bearing surfaces of the temple 16, the screw 18 and the other parts of the joint. This is permitted by the fact that the screw 18 is locked in place, the steel plate 38, for example, taking the turning friction of the temple. Should wear occur, furthermore, it may be compensated for by turning the screw further into its opening 28 and again expanding the walls of the aperture 30.

The countersunk opening 12 for the head 10 of the screw 8 may be provided in the end piece 6 instead of in the end piece 4, in which event the screw 8 will be threaded in the end piece 4, as illustrated in Figs. 8 to 17.

The thin, steel plate may be mounted loosely, as at 38, Fig. 6; or it may be mounted as at 42, Fig. 8, in combination with a block 44 and the end piece 6, all three parts being held together by mechanical means and by being soldered to one end of the split rim 2, the end piece 4 being soldered to the other end of the split rim 2. This, in effect, results in a unitary member equivalent, in some respects, to the single end piece 6, Figs. 1 to 6.

In this construction, therefore, the plate 42 extends throughout the length of the end piece 6, but the block 44 is of smaller length to provide a space for receiving the temple.

An advantage of this construction is that any turning movement between the plate 42 and the head of the screw 18 is thus prevented, and a much larger surface is presented to the pivoted temple 16, thereby substantially increasing its frictional durability.

Such durability may be still further increased by incorporating another and similar steel plate 46 between the block 44 and the end piece 6, as shown in Fig. 10. Both steel plates 42 and 46 are fastened mechanically to the block and to the lower end piece 6 and are also soldered to the eyewire. This will insure a smooth, hard bearing, such as hardened steel, for each side of the temple, as it swings between the plates.

It is well known that the ideal frictional bearing for long service is made by a combination of hardened steel for one surface and a softer metal for the other.

In Figs. 9 and 11, the two ends of the split rim 2 are shown separated to remove the lens without disturbing the temple.

The steel plate or plates may be embedded in a cavity or cavities 48 in the end pieces, as illustrated in Figs. 11 to 13, so that they will not show when looking at the end piece edgewise. The cavities are slightly shallower than the thickness of the hard metal plates, so that the temple will not rub on the soft metal of the end pieces.

Though the hardened plate 42 prevents any contact between the screw head 24 and the side of the temple, there is nothing to prevent a turning contact between the body of the screw 18 and the walls of the surrounding temple; even if the hole 56 through the temple is substantially larger than the body of the screw.

According to the modifications illustrated in Figs. 14 to 16, the construction may be still further improved by providing the temple with a cone-shaped bearing.

The cone may be linear in longitudinal, axial section, as shown at 52, Figs. 14 and 15, or somewhat curved or domed, as shown at 54, Fig. 16; in either case, though two oppositely disposed cones 52 and 54 are illustrated, a single cone (not shown) may be employed, if desired. The cones 52 and 54 make it possible to make the opening 56 in the temple of larger diameter than the diameter of the body of the screw 18; for, in co-operation with cooperating conical walls 58 and 60 upon the end piece 6 and corresponding conical portions 62 and 64 upon the under side of the head 24 of the screw 18, they positively locate the position of the temple. The cones 52 and 54 thus make it possible to provide a greater bearing surface for the temple; and, at the same time, to prevent frictional contact between the wall of the temple opening 56 and the unthreaded body portion of the screw 18 during the turning movement of the temple 16.

This conical construction completely controls the location of the temple 16 relative to the screw 18. It will not permit the removal of the temple 16 unless the lens screw 8 should first be loosened; but the lens could still be removed without disturbing the temple.

With the domed construction 54, instead of the conical construction 52 of the bearings, and if the dome is in very low relief, the temple 16 could be removed with only a slight loosening of the lens-holding screw 8.

The hard metal plates 42 and 46 are shown correspondingly conical and domed in Figs. 14 to 16.

The construction involving the block 44, illustrated in Figs. 8 to 16, may be employed without the hardened plates 42 and 46, as illustrated in Figs. 17 and 18. In addition to the advantages above described, this construction permits of arranging a temple stop 75 that is very effective in use and neat in appearance; all that is necessary is properly to blank out the intermediately disposed block 44.

When the end pieces 4 and 6 illustrated in

Figs. 2, 4 and 6 are employed, which is usually effected by sawing out along the portions 20 and 64, for example, it is very difficult to get a good fit and a good bearing for the temple. Too deep or too shallow sawing of the cut varies the position of the temple arm 16 from normal and causes a misfit at the temple point 66.

If the saw cut is too deep, the point 66 (Fig. 1) of the temple will swing too far in; if the cut is too shallow, the point 66 will contact too soon with the wall 64, so that it will be left altogether outside of the end piece.

With the proposed new method of a three-part end piece 4, 6 and 44, the central portion 44 is blanked or wedged to shape without injurious variations.

The temple-joint portion is also made in the same manner.

Another distinct advantage of the three-part end is that the end pieces 4 and 6 may be struck in dies and their inner faces shaped to perform very useful functions. As, for instance: it is very desirable to perform the turning movement of the temple without having it come in contact with the body of the pivot screw or dowel.

This may be accomplished by raising a ring of metal 68 and 69, Fig. 17, about the pivot dowel 18, or screw hole 28, the hole 56 through the temple being large enough to fit loosely over the metal ring.

A like ring or rings 70 and 71 could be raised about the binding screw hole 72, Fig. 17. The said ring 70 enters the enlarged hole 74 through the inner block 44.

These rings are for the purpose of more securely holding the block 44 against the thrust of the temple stop 76, Fig. 18.

Another advantage is in a novel method of imparting frictional control to the opening-and-closing movements of the temple, and to the finish and shape of the hinged members.

Ordinarily, the frictional control of the temple movement is obtained by clamping the end pieces with or without a screw against the sides of the temple joint.

A friction so obtained very soon ceases to be operative because of the wearing of the contacting parts, for which previously there has been no automatic remedy.

Such remedy is supplied by applying spring pressure to the periphery of the temple joint, or between the temple joint and the intermediate end-piece portion 44, as illustrated in Fig. 19. One end of a spring member 78 is fastened at 80 to the block 44 and its other end bears upon the curved periphery of the temple 16, and it is arranged to abut against the temple stop 76. This forms a perfect friction-controlling-and-positioning medium for the temple action.

An end-piece-and-temple structure is thus produced that provides a better controlled and a more permanent wearing frictional contact between them than has previously been the case, providing for more convenient adjustment and assembly. Durability and appearance have, at the same time, been enhanced.

Other modifications will occur to persons skilled in the art, and all such are considered to fall within the spirit and scope of the invention, as defined in the appended claims.

What is claimed is:

1. An ophthalmic mounting comprising an end piece of relatively light material having a threaded, substantially cylindrical opening, a plate having an opening alined with the end-piece opening, a member separate from and of less length than the end piece and the plate interposed between the end piece and the plate, the end piece, the plate and the member being secured together with the end piece and the plate projecting substantially the same distance beyond the member to provide a space for the insertion of a temple between the end piece and the plate, and a relatively small-dimensioned, light, substantially cylindrical, headed, metal screw received in the plate opening and threaded in the threaded opening with the free end of the screw substantially flush with a face of the end piece, the opening in the plate being smaller than the head of the screw in order that the head of the screw may engage the plate, the screw having a longitudinally extending aperture substantially parallel to the axis of the screw extending from the said free end of the screw a substantial distance inward toward the head of the screw so as to form a continuous, annular, exteriorly threaded wall, the continuous, annular wall being swaged by expansion, without breaking the continuity of the annular wall, into tight engagement with the wall of the threaded opening along a region extending from the end of the threaded opening near the said face a substantial distance into the threaded opening, the material and the dimensions of the screw being such as to cause the exterior threads upon the annular wall to lock frictionally against the threads of the threaded opening along the said region by the inherent resiliency of the swaged metal without the aid of a locking plug permanently positioned in the aperture, and the temple being pivoted to swing about the screw.

2. An ophthalmic mounting comprising a split rim, a first end piece of relatively light material secured to the rim at one side of the split, a second end piece of relatively light material secured to the rim at the other side of the split, a plate secured to the said one side of the rim between the end pieces, a member separate from and of less length than the end pieces and the plate secured to the said one side of the rim between the plate and the first end piece with the end pieces and the plate projecting substantially the same distance beyond the member to provide a space for the insertion of a temple between the first end piece and the plate, means for securing the end pieces, the plate and the member to hold the ends of the rim together, the second end piece having a threaded, substantially cylindrical opening, the first end piece having an opening alined with the threaded opening, the plate having an opening alined with the said openings, and a relatively small-dimensioned, light, substantially cylindrical, headed, metal screw positioned in the openings with the head of the screw in the opening of the second end piece and threaded in the threaded opening with the free end of the screw substantially flush with a face of the first end piece, the opening in the plate being smaller than the head of the screw in order that the head of the screw may engage the plate, the screw having a longitudinally extending aperture substantially parallel to the axis of the screw extending from the said free end of the screw a substantial distance inward toward the head of the screw so as to form a continuous, annular, exteriorly threaded wall, the continuous, annular wall being swaged by expansion, without breaking the continuity of the annular wall, into tight engagement with the wall of the threaded opening along a region extending from the end of the threaded opening near the said face a substantial distance into the threaded opening, the material and the dimensions of the screw being such as to cause the exterior threads upon the annular wall to lock frictionally against the threads of the threaded opening along the said region by the inherent resiliency of the swaged metal without the aid of a locking plug permanently positioned in the aperture, and the temple being pivoted to swing about the screw.

3. An ophthalmic mounting comprising an end piece, a plate, and a member separate from and of less length than the end piece and the plate interposed between the end piece and the plate, the end piece, the plate and the member being secured together with the end piece and the plate projecting substantially the same distance beyond the member to provide a space for the insertion of a temple between the end piece and the plate, the end piece and the plate being provided with alined openings to receive a headed post about which the temple is adapted to pivot, and the opening in the plate being smaller than the head of the post in order that the head of the post may engage the plate.

4. An ophthalmic mounting comprising a split rim, a first end piece secured to the rim at one side of the split, a second end piece secured to the rim at the other side of the split, a plate secured to the said one side of the rim between the end pieces, a member separate from and of less length than the end pieces and the plate secured to the said one side of the rim between the plate and the first end piece with the end pieces and the plate projecting substantially the same distance beyond the member to provide a space for the insertion of a temple between the first end piece and the plate, a screw extending through the end pieces, the plate and the member to hold the ends of the rim together, the second end piece having an opening therethrough, the plate having an opening alined with the said opening, and a headed screw positioned in the openings with the head of the screw in the opening of the second end piece and threaded in the first end piece, the opening in the plate being smaller than the head of the headed screw in order that the head of the headed screw may engage the plate, and the temple being adapted to pivot about the headed screw.

5. An ophthalmic mounting comprising an end piece, a plate, a member interposed between the end piece and the plate, a second plate interposed between the member and the end piece, the end piece, the plates and the member being secured together, the member being of less length than the end piece and the plates to provide a space for the insertion of a temple between the plates, the end piece and the plates being provided with alined openings to receive a headed post about which the temple is adapted to pivot.

6. An ophthalmic mounting comprising two elements, namely, a split rim and a temple, a first end piece of relatively light material secured to the rim at one side of the split, a second end piece of relatively light material secured to the rim at the other side of the split, a plate secured to the said one side of the rim between the end pieces, a member separate from and of less length than the end pieces and the plate secured to the said one side of the rim between the plate and the first end piece with the end pieces and the plate projecting substantially the same distance beyond the member to provide a space for the insertion of a temple between the first end piece and the plate, means for securing the end pieces, the plate and the member to hold the ends of the rim together, the second end piece having a threaded, substantially cylindrical opening, the first end piece having an opening alined with the threaded opening, the plate having an opening alined with the said openings, a relatively small-dimensioned, light, substantially cylindrical, headed, metal screw positioned in the openings with the head of the screw in the opening of the second end piece and threaded in the opening with the free end of the screw substantially flush with a face of the end piece, the opening in the plate being smaller than the head of the screw in order that the head of the screw may engage the plate, the screw having a longitudinally extending aperture substantially parallel to the axis of the screw extending from the said free end of the screw a substantial distance inward toward the head of the screw so as to form a continuous, annular, exteriorly threaded wall, the continuous, annular wall being swaged by expansion, without breaking the continuity of the annular wall, into tight engagement with the wall of the threaded opening along a region extending from the end of the threaded opening near the said face a substantial distance into the threaded opening, the material and the dimensions of the screw being such as to cause the exterior threads upon the annular wall to lock frictionally against the threads of the threaded opening along the said region by the inherent resiliency of the swaged metal without the aid of a locking plug permanently positioned in the aperture, and the temple being pivoted to swing about the screw, one of the elements having a cavity in which the plate is disposed.

7. An ophthalmic mounting comprising a split rim having end pieces each provided with a cavity, one of the end pieces having a threaded opening, a screw threaded in the opening having an unthreaded bearing portion and an enlarged head, a temple pivoted to swing about the bearing portion, the screw having an aperture, and the walls of the aperture being expanded into tight engagement with the walls of the threaded opening, a plate in one of the cavities interposed between the head and the temple, a second plate interposed in the other cavity, and a member between the plates of less length than the end pieces to provide a space between the end pieces for the temple.

8. An ophthalmic mounting comprising one or more end pieces of relatively light material and having a threaded, substantially cylindrical opening, a relatively small-dimensioned, light, substantially cylindrical, metal, headed, screw threaded in the opening with one end of the screw substantially flush with a face of the said one end piece, the screw having a longitudinally extending aperture substantially parallel to the axis of the screw extending from the said end of the screw a substantial distance inward toward the head of the screw so as to form a continuous, annular, exteriorly threaded wall, the continuous, annular wall being swaged by expansion, without breaking the continuity of the annular wall, into tight engagement with the wall of the threaded opening along a region extending from the end of the threaded opening near the said face a substantial distance into the threaded opening, the material and the dimensions of the screw being such as to cause the exterior threads upon the annular wall to lock frictionally against the threads of the threaded opening along the said region by the inherent resiliency of the swaged metal without the aid of a locking plug permanently positioned in the aperture, a temple pivoted to swing about the screw, and a plate interposed between the head of the screw and the temple, the temple having a conical bearing wall, the plate having a cooperating conical bearing wall, and the screw having a conical portion engaging the bearing wall of the plate.

9. An ophthalmic mounting comprising a split rim, two end pieces secured to the rim at opposite sides of the split, a member separate from the end pieces disposed between the end pieces and secured to one of the sides of the rim, the member being of less length than the end pieces to provide a space between the end pieces, a plate secured to the said one side of the rim between the member and the end piece secured to the said one side of the rim, a temple pivoted to the end pieces in the space so as to bear against the plate and having a curved portion, and a leaf spring one end of which is secured to the member at a point between the outer peripheries of the end pieces and the other end of which bears against the curved portion of the temple during its pivotal movement, the temple having a projecting stop for engaging the other end of the leaf spring.

10. An ophthalmic mounting comprising a split rim having end pieces each provided with a cavity, one of the end pieces having a threaded opening, a screw threaded in the opening having a bearing portion and an enlarged head, a temple pivoted to swing about the bearing portion, a plate in one of the cavities interposed between the head and the temple, a second plate interposed in the other cavity, and a member between the plates of less length than the end pieces to provide a space between the end pieces for the temple.

11. An ophthalmic mounting comprising a split rim, a first end piece secured to the rim at one side of the split, a second end piece secured to the rim at the other side of the split, a plate secured to the said one side of the rim between the end pieces, a member separate from and of less length than the end pieces and the plate secured to the said one side of the rim between the plate and the first end piece with the end pieces and the plate projecting substantially the same distance beyond the member to provide a space for the insertion of a temple between the first end piece and the plate, and means for securing the end pieces together, the end pieces and the plate having alined openings to receive a headed post about which the temple is adapted to pivot, and the opening in the plate being smaller than the head of the post in order that the head of the post may engage the plate.

12. An ophthalmic mounting comprising two elements, namely, a split rim having end pieces and a temple, one of the end pieces being secured to the rim at one side of the split, the other end piece being secured to the rim at the other side of the split, a plate secured to the said one side of the rim between the end pieces, a member separate from and of less length than the end pieces and the plate secured to the said one side of the rim between the plate and the first end piece with the end pieces and the plate projecting substantially the same distance beyond the member to provide a space for the insertion of the temple between the first end piece and the plate, one of the end pieces having a headed post about which the temple is adapted to pivot, and the plate having an opening in which the post is positioned, the opening being smaller than the head of the post in order that the head of the post may engage the plate, one of the elements having a cavity in which the plate is disposed.

13. An ophthalmic mounting comprising a split rim, two end pieces secured to the rim at opposite sides of the split, a member separate from the end pieces interposed between the end pieces and secured to one of the sides of the rim, the separate member being of less length than the end pieces to provide a space for the insertion of the temple between the end pieces, a plate secured to the said one side of the rim between the member and the end piece secured to the said one side of the rim, means for securing the end pieces together, one of the end pieces having a threaded opening, and a screw threaded in the opening having a body portion and an enlarged head, the temple being pivoted to swing about the body portion, the temple having a conical bearing wall, and the plate having a cooperating conical bearing wall.

FREDERICK A. STEVENS.